Figure 1A:
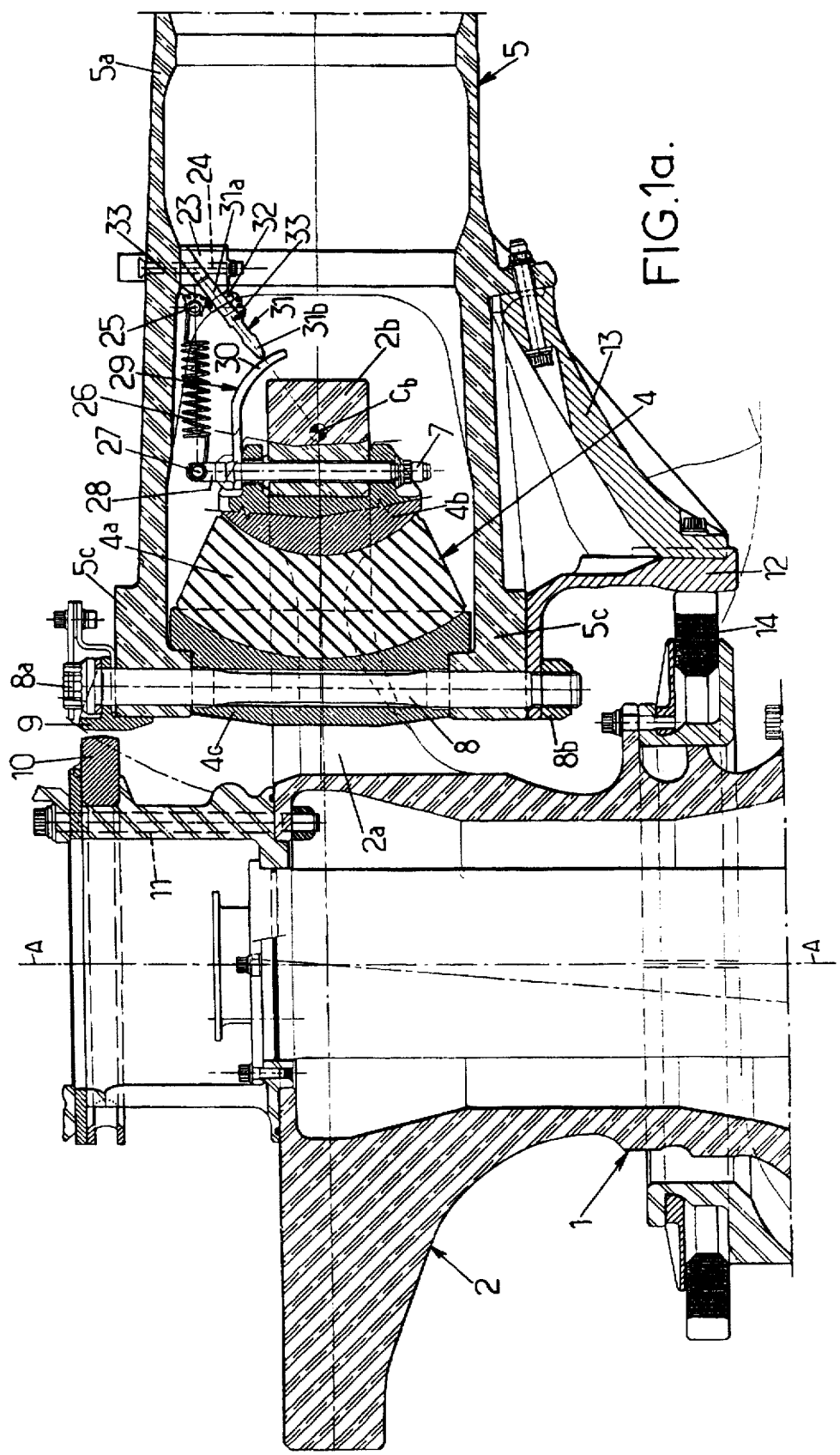

United States Patent [19]
Mondet et al.

[11] Patent Number: 5,716,193
[45] Date of Patent: Feb. 10, 1998

[54] INSTALLATION FOR AFFORDING ELECTRICAL CONTINUITY FOR ROTORCRAFT ROTOR

[75] Inventors: Jean Joseph Henri Mondet, Pelissanne; Charles Marcel Denis Louis, Aix en Provence, both of France

[73] Assignee: Eurocopter France, Marignane Cedex, France

[21] Appl. No.: 679,220

[22] Filed: Jul. 12, 1996

[30] Foreign Application Priority Data

Jul. 21, 1995 [FR] France ................... 95 08887

[51] Int. Cl.[6] ............ B64C 27/39; B64C 27/50
[52] U.S. Cl. ............ 416/134 A; 416/39; 416/140; 416/141; 416/143; 416/146 R; 416/500; 244/1 A; 361/218
[58] Field of Search ............... 416/39, 134 A, 416/140, 141, 143, 145, 146 R, 107, 500; 244/1 A, 134 D; 174/2, 3, 4 R, 4 C, 5 R, 5 SB, 5 SG, 51; 361/216, 217, 218; 439/92, 95, 103

[56] References Cited

U.S. PATENT DOCUMENTS

| 3,804,552 | 4/1974 | Covington | 416/140 |
| 4,268,222 | 5/1981 | Bernard | 416/143 |
| 4,304,525 | 12/1981 | Mouille | 416/134 A |
| 4,574,325 | 3/1986 | Holton | . |
| 5,267,833 | 12/1993 | Mouille | 416/107 |

FOREIGN PATENT DOCUMENTS 0793538  4/1958  United Kingdom ............ 416/143

Primary Examiner—Christopher Verdier
Attorney, Agent, or Firm—Larson & Taylor

[57] ABSTRACT

The installation for removing electrostatic charge and passing lightning current between a conductor of each blade of the rotor and a metallic part of the hub comprises at least one conductive member integral with the member for linking the blade to the hub in its angular deflections, and in electrical continuity with the conductor of the blade and held elastically in permanent contact with a conductive terminal integral with the hub and in electrical continuity therewith.

20 Claims, 6 Drawing Sheets

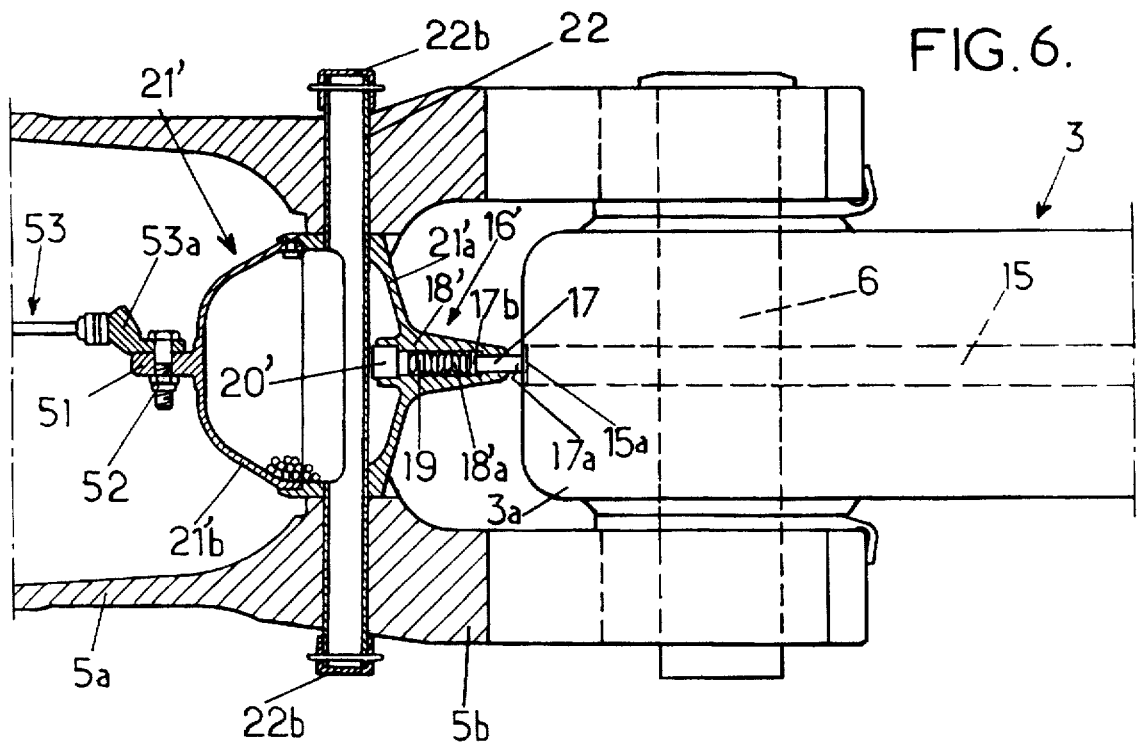
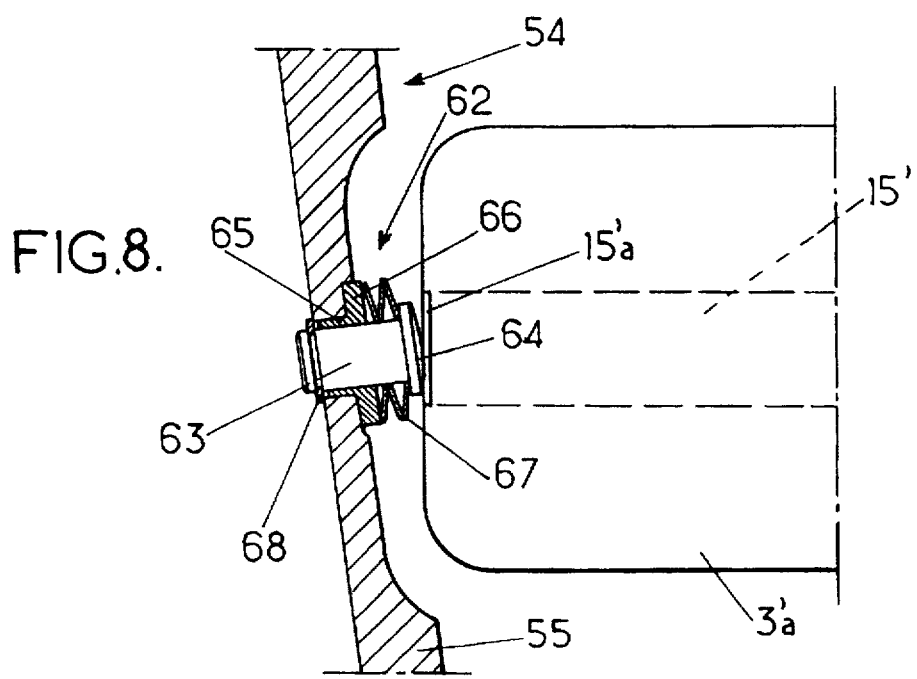

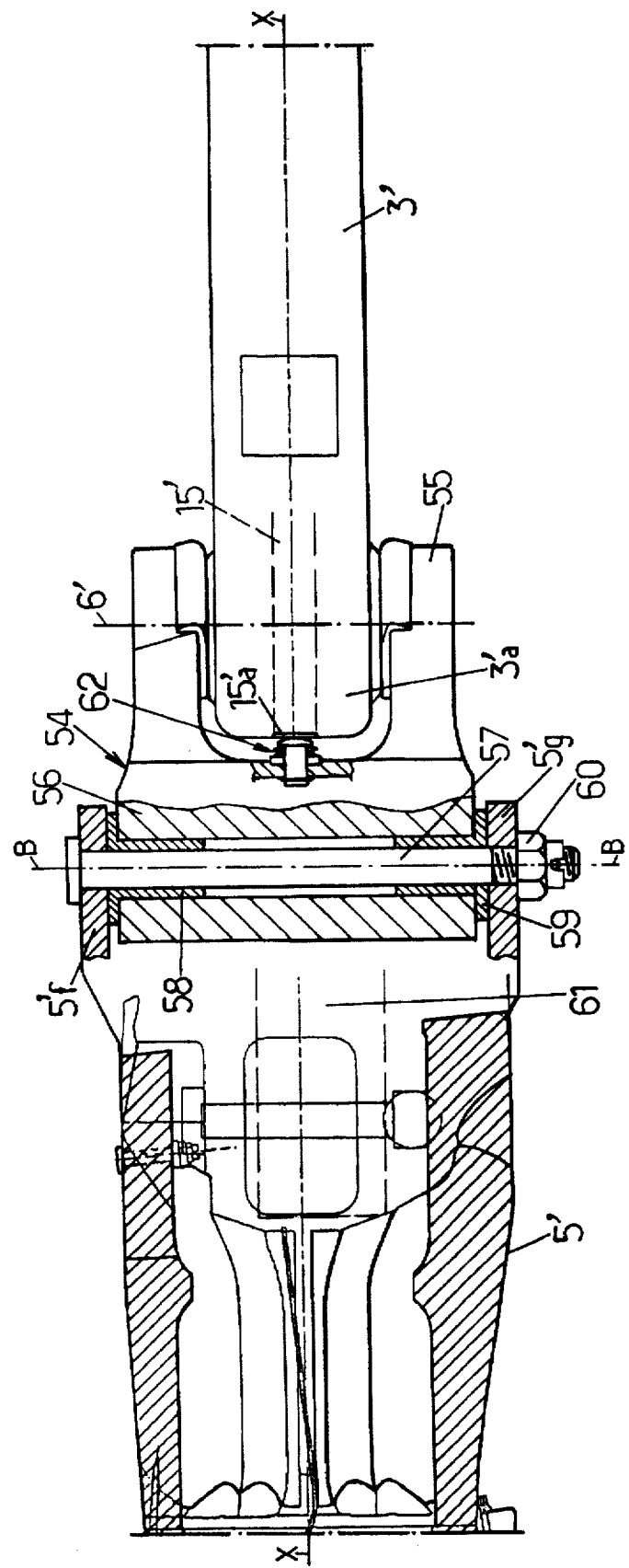

INSTALLATION FOR AFFORDING ELECTRICAL CONTINUITY FOR ROTORCRAFT ROTOR

The invention relates to an installation for affording electrical continuity for the removal of electrostatic charge and the passing of lightning current on a rotorcraft rotor, such as a helicopter main rotor or tail rotor, and of the type comprising:
- a hub integral in terms of rotation with a rotor mast about an axis of rotation, and such that the mast-hub assembly includes at least one metallic part in electrical continuity with the structure of the rotor-craft, and
- at least two blades, each of which is connected to the hub via a linking member which is substantially radial with respect to the axis of rotation, and itself connected to the hub by retaining and articulating means.

On rotorcraft, particularly helicopter, rotors, it is known practice to produce links especially between the blades of a rotor and its hub, in order to afford electrical continuity between these components so as to guarantee their protection against aggression due to lightning currents or to the build-up of electrostatic charge, with the purpose of improving the flight safety of these aircraft, particularly in stormy conditions.

In order to remove the electrostatic charge which builds up on a rotor blade, and also to pass lightning currents through the blade, from a point where the lightning strikes this blade and as far as a point where it leaves the blade, it is known for each blade to comprise at least one electric conductor, and preferably a loom of such elongate so-called "metallization" electric conductors embedded in the blade for passing electrostatic charge and lightning current, and this or these conductors is or are connected to said metallic part of the mast-hub assembly, in electrical continuity with the structure of the rotorcraft, by means affording the installation electrical continuity.

These means for affording electrical continuity generally consist of metallization conductors comprising metallic conductive braids forming loops and providing overhead passages between the elements of the rotor to be connected, for example the blades and the hub, to which these metallization conductors are fixed by means of terminal clamps and sleeves producing the electrical connections at the ends of the braids.

Examples of such metallization conductors are described in FR-A-2,368,154 and FR-A-2,679,074.

It is found that the mechanical integrity of such metallization conductors, particularly the mechanical integrity of the crimping of a conductive central core surrounded by a conductive braid inside the terminal clamps is not satisfactory, especially under the effect of the tensile centrifugal forces exerted on these metallization conductors on a rotating rotor, and also under the effect of the alternating movements to which they are subjected in order to follow the components on which and/or between which they are fixed, as a result of the alternating angular deflections, in terms of pitch, flapping and drag, of the blades with their linking member relative to the hub of the rotor. In particular, it is found that the crimping works loose, essentially by the slipping of the conductor within the housing of the terminal clamps, this phenomenon of the crimping working loose being all the more accentuated when the metallization conductors form a loop, as is the case between the hub and a member for linking a blade to the hub, and also in the case of a rotor with hinged blades that can be folded back by pivoting relative to the member linking them to the hub, between this linking member and the root of the corresponding blade, and when current flows through the metallization conductor, which is the case when a blade is struck by lightning. Indeed, in this case, repulsive forces of a magnetic nature resulting from the mutually opposing components of the current vector flowing through the conductor appear, these forces being all the greater as the current strength and radius of curvature of the conductor increase, so that there is a risk of a braid or of a conductor terminal clamp breaking.

What is more, the overhead passages and loops of the metallization conductors, which are necessary because of the deflections of the blades and their linking members relative to the hub, in flight, and also because of the deflections of the blades relative to their linking members, on the ground, and in the case of the blades being folded back, give weight to the risk of mechanical interferences, and therefore snagging and pulling out, with other components of the rotor head, or close to it, in the various configurations in which the rotor is used.

The problem at the root of the invention is therefore, on a rotor of the type explained hereinabove, to avoid the loops and overhead passages of the metallization conductors between, essentially, the hub and the members for linking the blades to the hub and, preferably, also between these members and the blades of the rotor.

In general, the object of the invention is to overcome the aforementioned drawbacks of the installations for affording electrical continuity to rotorcraft rotors, and to propose such an installation which is better suited than the known ones to the various desired practical requirements.

To this end, the invention proposes an installation of the type explained hereinabove, which is characterized in that the means affording electrical continuity comprise, for each blade, at least one first electrically conductive member integral with the corresponding linking member in its deflections in terms of pitch, flapping and drag with said blade relative to the hub and so that said first member is in electrical continuity with said electric conductor of the blade, and held elastically in permanent contact with a first electrically conductive terminal integral with the hub and in electrical continuity with said metallic part of the mast-hub assembly. In this way, any conductive loop as an overhead passage between the hub and the member linking each blade to the hub is avoided.

In a first embodiment, in which the first conductive member provides both the metallization (removal of electrostatic charge) and the passage of lightning current, this first member is mounted on an arm swivelling on a first support fixed to the linking member, the arm being acted upon by first elastic return means applying the first conductive member into elastic contact against said first terminal.

Advantageously in this case, in order to afford electrical continuity from the first conductive member to the linking member, said first conductive member is mounted in conductive contact on the swivelling arm which is electrically conductive, and in conductive contact with said first electrically conductive support and in electrical continuity with said conductor of the blade, said first elastic means resting on said first support.

In order to make assembly and disassembly easier, and in order to take account of the non-linear change in the resultant of the mutually opposing forces which are due to centrifugal force and to the first elastic return means, the latter is advantageously mounted between the swivelling arm and the first support about a spindle fixed to the arm and capable of moving axially relative to the first support on which the spindle is held, with axial play, by a stop limiting the amplitude of swivelling of the arm.

As an alternative, to avoid mounting a special first support on the linking member, the first support is an element which is already provided on the linking member for other purposes, particularly a drag stop or drag stop support for the corresponding blade, and attached to the linking member, in which case the first elastic return means comprises, in an advantageously simple structure, at least one spring leaf fixed by an end part to the swivelling arm and elastically resting by another end part against the first support, consisting of or supporting said drag stop, the spring leaf working in bending in order to apply this first conductive member against the first terminal.

According to a simple and reliable structure, said first conductive member is a ball made of cemented steel, crimped into an end of the swivelling arm mounted so that it can pivot, by its other end, about a spindle substantially perpendicular to the radial direction of the corresponding linking member, and said first terminal comprises a track in the form of a spherical cap projecting substantially radially outwards, and substantially centered on a center of articulation of said corresponding retaining and articulating means, in order to receive the elastic thrust of said ball during the angular deflections in terms of pitch, flapping and drag of the linking member and of the blade relative to the hub and about said center of articulation.

By contrast, if it is desired to separate the passage of electrostatic charge from the passage of lightning current, the first conductive member is advantageously elastically deformable and of variable length, such as a coil spring, preferably prestressed, for example in tension, in order to compensate for the variations in distance between the points where its ends are anchored, for the removal of electrostatic charge, this first member being linked, on the one hand, to a first electrically conductive support mounted on said linking member and in electrical continuity with said conductor of the blade and, on the other hand, to said first terminal, the means for affording electrical continuity additionally comprising, for each blade and for passing lightning current, a spark arrester in the form of an electrically conductive needle fixed close to said first conductive member on said first conductive support and such that its point is directed towards a center of articulation of said retaining and articulating means, while being spaced a small distance away from a track in the form of a spherical cap projecting substantially radially outwards and substantially centered on said center of articulation of said second terminal. In this structure, it is understood that mounting the needle of the spark arrester on the first support close to a coil spring acting as first conductive member or several springs mounted in parallel has the advantage that the spring or springs serve to attract electricity for the spark arrester.

In the various aforementioned examples, the first terminal may advantageously be fixed to the hub by electrically conductive means for fixing said corresponding retaining and articulating means to a conductive metallic part of the hub in electrical continuity with the structure of the rotorcraft.

In particular, for a rotor on which the internal radial part of each linking member is arranged as an internal clevis block, and the corresponding retaining and articulating means comprise a laminated spherical stop with an internal radial armature fixed between the branches of the internal clevis block and an external radial armature fixed by at least one electrically conductive threaded spindle on said metallic part of the hub which is engaged in the internal clevis block, and in which the center of articulation of said laminated spherical stop lies, it is advantageous for the terminal with a track in the form of a spherical cap to be fixed to the hub by said threaded spindle so that the track in the form of a spherical cap is arranged inside the internal clevis block with its convexity pointing substantially radially outwards, said first conductive member, said first conductive support and, if appropriate, said first elastic return means and said swivelling arm or said spark arrester needle also being mounted in said internal clevis block. The advantage of such a structure is that this mechanism is visible and easily accessible from the side in the internal radial clevis block of the member linking each blade to the hub, which makes maintenance operations easier.

At the connection between each blade and its member for linking to the hub, when this linking member is not a forked blade root but a separate member, generally known as a cuff, in the external radial part of which the blade root is held, in the flight configuration, and may possibly pivot for folding the blade back relative to this member, it is advantageous for the means affording the installation electrical continuity also to comprise, for each blade, at least one second electrically conductive member which is deformable and/or can move on a second support integral with one of the elements that are the root of the corresponding blade and the corresponding linking member, the second conductive member, at least when the blade is in the flight configuration, being held by second elastic return means in permanent contact against a second electrically conductive terminal borne by the other of said elements, the second conductive element and the second conductive terminal being in electrical continuity, one with said conductor of the blade, and the other with said first conductive member.

Advantageously, according to a lightened mechanism for permanent contact, except when the blade is possibly folded back relative to its member for linking to the hub, and which provides for the passage of static electricity and serves as spark arrester in the event of lightning, the second conductive member may be a push-rod mounted so that it can slide in the second support, which is an electrically conductive and tubular body with which the push-rod remains in permanent contact, and from which the push-rod projects by one end of the push-rod applied against the second conductive terminal under the action of the second elastic return means, preferably electrically conductive, acting upon its other end arranged as a stop preventing the push-rod from coming out of the body, said second elastic return means being arranged in a housing of the conductive body and resting against a plug, preferably an electrically conductive one, for closing the said housing.

The second conductive terminal may be an attached part, for example one screwed or bonded to the element bearing it, so that it is in electrical contact with a conductive part of this element, but it is also possible for this second conductive terminal to consist of part of an electric conductor for passing electrostatic charge and lightning current, and which appears at the surface of the element bearing it, particularly when this element is the blade, because then the electric conductor, part of which constitutes the second conductive terminal, is advantageously a conductor of the loom for metallizing this blade.

In particular, for a rotor on which the external radial part of each linking member is arranged as an external clevis block, in which the root of the corresponding blade is held by two substantially mutually parallel pins, one of which is removable to allow the blade to be folded back relative to the linking member by pivoting about the other pin, it is advantageous for said second conductive terminal to be on the internal radial end of the blade root, and said second support to project, opposite said second terminal, into said external clevis block of the linking member, so that when the blade is in the folded-back position, said second conductive member is no longer in contact with the second terminal.

In addition, if each blade/linking member assembly is balanced by a shot pot, in a way known per se, it is then advantageous for the second support to be fixed to or integral with an external radial part of the shot pot, itself electrically conductive and arranged substantially in the bottom of said external radial clevis block of the linking member so that the second conductive member projects substantially radially outwards from the second support, against the second terminal on the root of the blade in the flight configuration. To make production easier, the shot pot may be held as a spacer piece between the two opposed branches of the external radial clevis block of the linking member by at least one tubular pin for filling and emptying the pot.

Between the first conductive member and that one of the second conductive member and of the second conductive terminal which is mounted on the linking member, the electrical continuity may be afforded by the linking member, which for this purpose is at least partially electrically conductive, this particularly being the case when the linking member is an entirely metal member. However, in the case of a linking member which is electrically insulating, the means for affording electrical continuity may comprise, for each blade, at least one conductive cable for passing electrostatic discharge and lightning current, which may comprise a conductive braid and advantageously be such as described in FR-A-2,679,074 and which runs, substantially radially relative to the axis of rotation, in or along the linking member, generally between the second conductive member or the second conductive terminal on the blade and the metallic part of the hub in electrical continuity with the mast-hub assembly and which, more specifically, is electrically connected, by its internal radial end, to the first conductive member or to the support therefor, or alternatively to the first conductive terminal or any conductive member connecting it to the hub and, by its external radial end, to that one of the second conductive member and of the second conductive terminal which is mounted on the linking member.

It is also possible, when the linking member is shaped into a cuff at its central part, for the conductor with metallization braid and for passing lightning current to run in this cuff, which protects it and limits its movements, and to be connected directly via its internal radial end to the metallic part of the hub in electrical continuity with the structure of the aircraft, preferably using fixing means which fix the corresponding retaining and articulating means to this part of the hub.

For a rotor on which, for each linking member, the root of the corresponding blade is held in an external clevis block of a hinging fitting mounted on the linking member by a pivoting link about an axis for folding back the blade with the fitting relative to the linking member, in order to allow the blades to be folded back automatically by actuators mounted in the linking members, the second conductive terminal is advantageously on the internal radial end of the blade root, and said second support is in said external clevis block of the hinging fitting and opposite said second terminal, so that the second conductive member projects substantially radially outwards from the second support and is in permanent elastic conductive contact with the second terminal in order to afford electrical continuity between the blade and the fitting, the electrical continuity between the fitting and the linking member being afforded by conductive contact with at least one conductive pivot pin. In this case, according to an advantageously simple and economical, lightweight and low-bulk embodiment, the second conductive member is a contact peg with a head equipped with a spherical bearing surface for contact with the second terminal and is pushed back by elastic means resting against the second support arranged as a stepped ring mounted in the bottom of the clevis block of the fitting and in which the peg slides with limited travel.

Figure 1B:
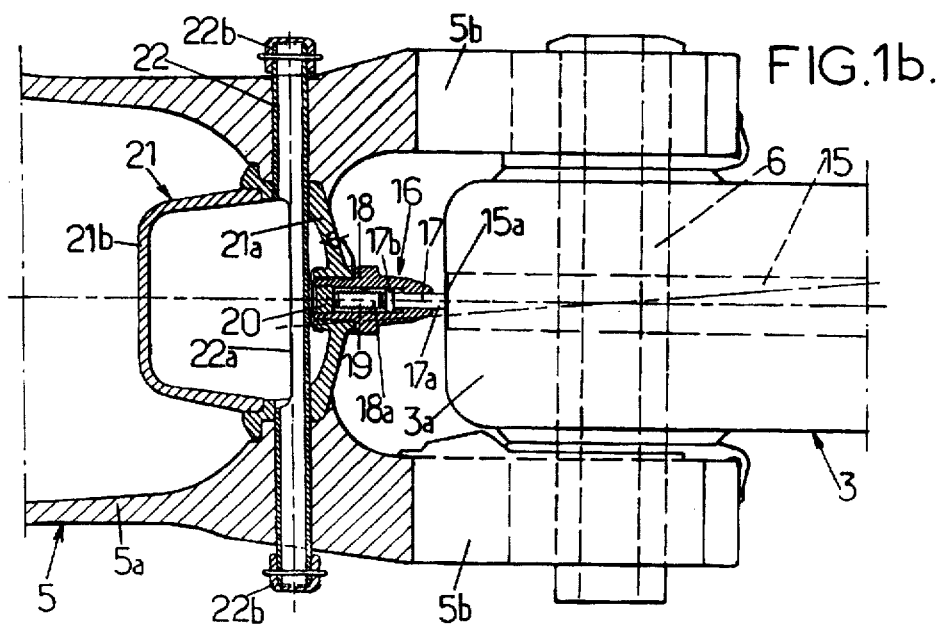
Figure 2:
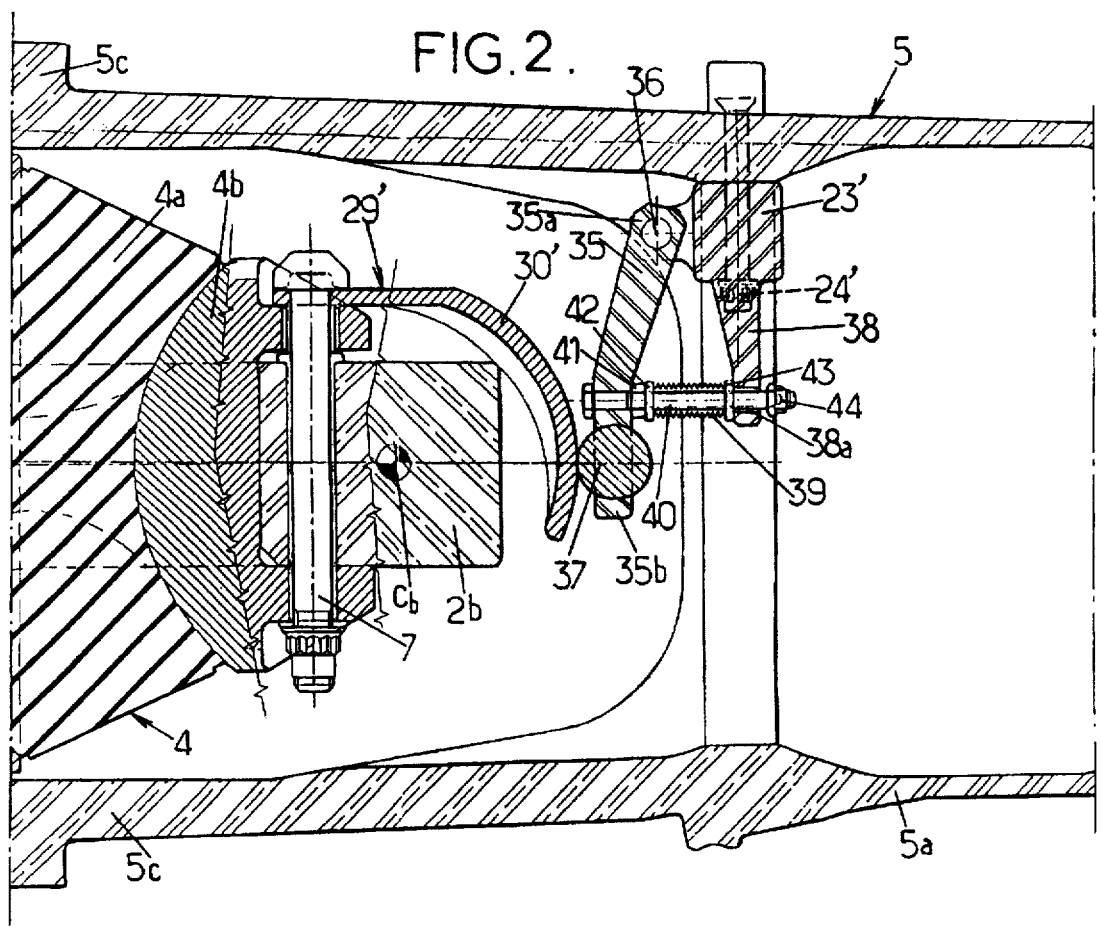
Figure 3:
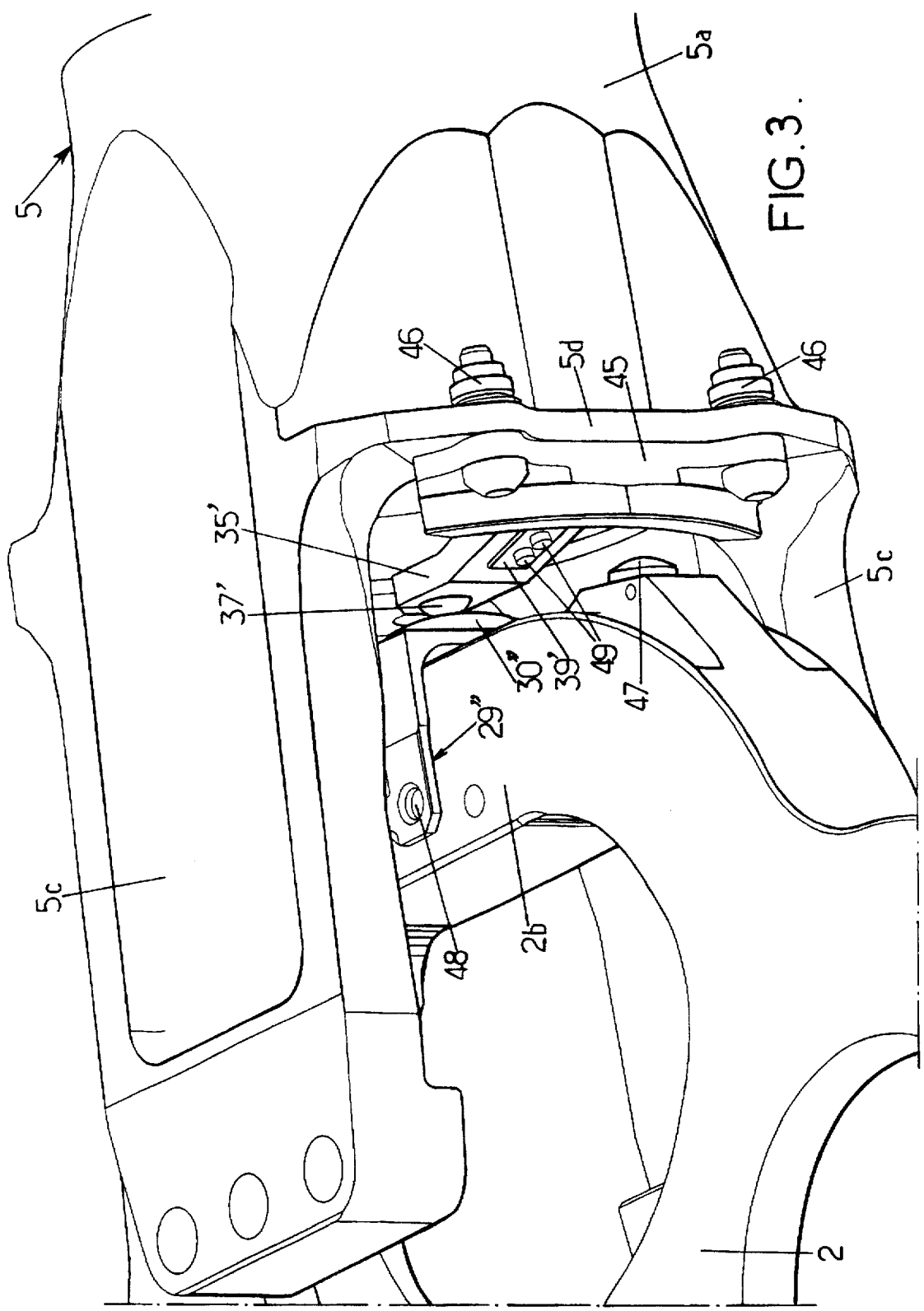
Figure 5:
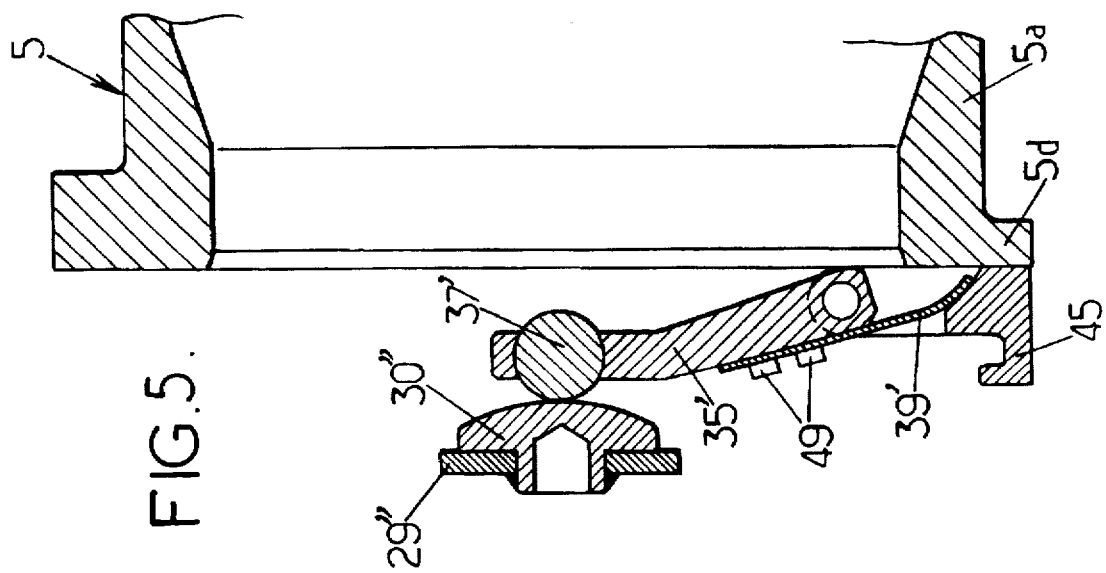
Figure 4:
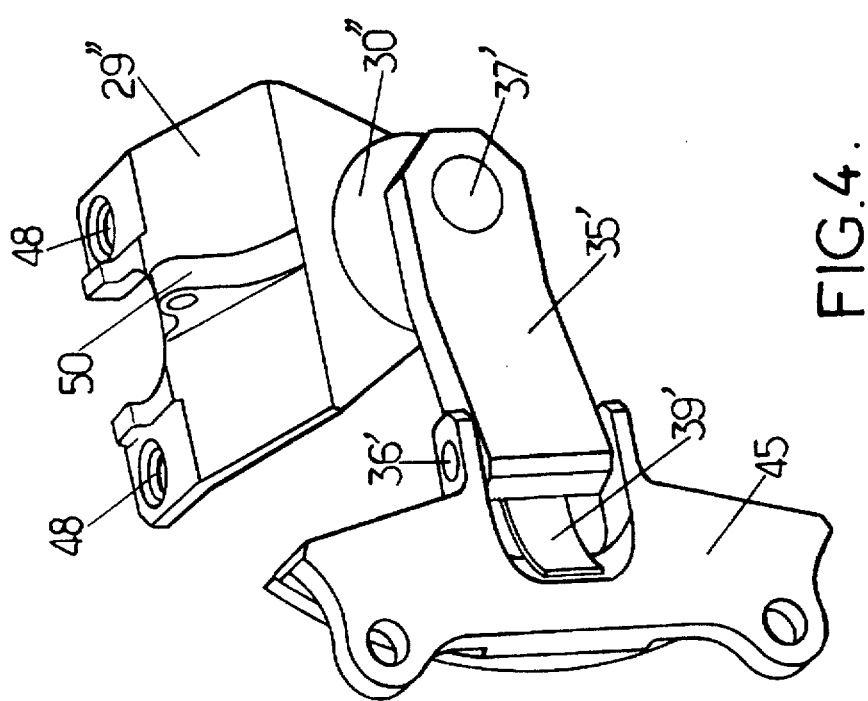

Further advantages and features of the invention will emerge from the non-limiting description given herein below of embodiments described with reference to the attached drawings in which:

FIGS 1a and 1b represent, in diagrammatic section on a substantially radial plane, passing through the axis of rotation of the rotor and through a longitudinal axis of a blade of the rotor, the respectively internal radial and external radial parts of a rotor head with blades that can be folded back manually by pivoting about one of the two pins retaining the blade root in a cuff for linking to the hub of the rotor, FIG. 2 is a view in section on a larger scale of part of the rotor head of FIG. 1a, in which figure an alternative form of the installation of FIG. 1a for affording electrical continuity is shown, FIG. 3 is a part view in perspective of a second alternative form of an installation for affording electrical continuity, on the two members of a rotor head similar to the one in FIGS 1a and 1b, and with which it interacts, FIG. 4 is a perspective view of the elements of the installation for affording electrical continuity which are visible in FIG. 3, FIG. 5 is a part view of FIG. 3 in transverse section on a plane perpendicular to the axis of rotation of the rotor and passing substantially through the longitudinal axis of the corresponding cuff, FIG. 6 is a view similar to FIG. 1b for an alternative form of the external radial part of the rotor head with manually foldable blades, FIG. 7 is also a view similar to FIG. 1b but for a rotor head in which each blade has its root held in a hinging fitting, with which the blade is automatically folded back and which constitutes the external radial part of a cuff for linking to the hub of the rotor, this figure showing the electrical continuity on the one hand between the blade root and the hinging fitting and, on the other hand, between the fitting and the cuff, and FIG. 8 represents a detail on a larger scale of the means affording electrical continuity between blade and hinging fitting in the embodiment of FIG. 7.

FIGS 1a and 1b partially represent a helicopter main rotor in which the tubular rotor mast 1 has its top part integral with a hub 2, rotating with it about the axis of rotation A—A of the rotor. The hub 2 is arranged as a radial plate (relative to the axis A—A) with cavities, having, for each of the blades 3 of the rotor, a cavity 2a passing axially through an external radial part of the hub 2, in order partially to house means 4 for retaining and articulating on the hub 2 a member 5 for linking the corresponding blade 3 to the hub 2.

The linking member 5, termed cuff in the remainder of the description, because its central part 5a is tubular (as visible in the alternative of FIG. 3), is a member arranged substantially radially relative to the axis A—A and which, in this example, is metallic and electrically conductive. The radially external and internal end parts of this cuff 5 are formed respectively into an external clevis block 5b with two parallel branches between which the blade 3 is held by its root 3a, and into an internal clevis block 5c, the two parallel branches of which are used for linking to the retaining and articulating means 4.

In a known way, the blade root 3a is held in the external clevis block 5b by two pins 6 (just one of which is visible in FIG. 1b) which are mutually parallel, symmetric on each side of the longitudinal axis of the cuff 5, and substantially perpendicular to this longitudinal axis. One of the pins 6 is removable so that the blade 3 can be folded back manually towards the front or towards the back of the helicopter after the rotor stops, by pivoting relative to the cuff 5 about the other pin 6.

As also known, the retaining and articulating means 4 consist of a laminated spherical stop, comprising a central part 4a consisting of an alternating stack of layers of an elastically deformable elastomeric material and of cups made of a rigid material in the form of portions of a sphere between, on the one hand, an external radial armature 4b straddling the external radial edge 2b of the corresponding cavity 2a of the hub and fixed to this edge 2b of the hub by electrically conductive threaded metallic spindles, such as 7 and, on the other hand, an internal radial armature 4c which, like the external armature 4b, is metallic and electrically conductive. The internal armature 4c passes through the cavity 2a and is fixed as a spacer piece between the branches of the internal clevis block 5c by threaded spindles such as 8, of which the flanged tightening heads 8a hold an upper heel 9 fixed on the internal radial end of the upper branch of the internal clevis block 5c opposite an anti-cone stop mechanism 10, retractable in flight, mounted on a tubular support 11 bolted above the tubular central part of the hub 2. The anti-cone stop mechanism 10, which may be surmounted by an assembly with a shaped cover and cover and sling-attachment support (not described and not represented) is not described further because it does not form part of the invention. The nuts 8b screwed onto the lower ends of the spindles 8 projecting under the lower branch of the internal clevis block 5c hold a lower heel 12 fixed under the internal radial end of this lower branch, this lower heel 12 being held by a spacer piece 13 bolted on a lower flange of the cuff 5 so as to position the heel 12 radially opposite a bottom flap stop, common to all the blades and used, in the known way, in the form of a droop restrainer ring 14 mounted with radial clearance about the rotor mast 1.

Each blade 3 is equipped with a loom of so-called "metallization" electrical conductors for removing electrostatic charge and passing lightning current, these metallization conductors being built into the blade and running across its entire span. As is known, these metallization conductors are produced, for example, in the form of thin tapes or strips of a metal which is a good conductor of electricity, such as copper, and the internal radial end of this conductive loom, in the form of a copper tape or foil 15 emerges at the surface of the blade 3 to form an exit point for the electrostatic discharge and lightning current, forming on the blade 3 an electrically conductive terminal 15a accessible on the center of the internal radial face of the blade root 3a.

Opposite the conductive terminal 15a, formed on the blade root 3 by an emerging part of the copper tape 15 of the loom of metallization conductors of the blade 3, the bottom of the external clevis block 5b of the cuff 5 has, except when the blade 3 is folded back by pivoting about one of the pins 6, a lightened mechanism for permanent electrical and elastic contact, for ensuring the removal of electrostatic charge from the blade 3 to the metallic cuff 5 and to serve as a spark arrester in the event of the blade 3 being struck by lightning, so as to pass the lightning current from the blade 3 to the cuff 5.

This permanent elastic contact mechanism 16 comprises a push-rod 17 with a cylindrical rod mounted axially so that it can slide with friction in a tubular body 18 so that one axial end 17a of the push-rod 17 projects outside the body 18 towards the terminal 15a and the blade root 3a, whereas the opposite axial end of the push-rod 17 is formed with a widened head 17b received in an internal housing 18a of the body 18 and forming a stop against the bottom of this housing 18a, on the same side as the blade root 3a, to prevent the push-rod 17 from coming out of the body 18 under the thrust of elastic return means 19 consisting of a stack of metallic spring washers, or alternatively of a metallic compression coil spring. These means 19 forming a spring are arranged in the axial housing 18a of the body 18 and rest, on the opposite side from the push-rod 17, on a metallic plug 20 fixed, for example by screw-fitting, in the corresponding end of the bore forming the housing 18a, which may optionally also contain grease. The push-rod 17 and the body 18 are metallic and electrically conductive, as too are the means 19 forming the spring and the plug 20. The body 18 is fitted, by screwing its part surrounding the plug 20, into the central part of a metallic external radial end 21a of a shot pot 21, closed by an internal radial part 21b secured to the bottom 21a, which is mounted as a spacer piece between the two opposed branches of the external clevis block 5b and held in this position with the aid of a tubular metal pin 22, of which the central part passing through the shot pot 21 has a wide lateral opening 22a placing the inside of the tubular pin 22 in communication with the inside of the shot pot 21, and of which the end parts each pass respectively through one of the branches of the clevis block 5b so that the ends of the pin 22 project, one above the upper branch and the other below the lower branch of the clevis block 5b, being closed by removable plugs 22b to allow the pot 21 to be filled with shot and to allow it to be emptied so that by using a greater or lesser amount of shot in the pot 21, the flapping mass consisting of the blade 3 and of the cuff 5 and articulated to the hub 2 by the laminated spherical stop 4 can be balanced. The shot pot 21 is metallic and electrically conductive in both of its parts 21a and 21b, and its bottom 21a is, because of the way it is mounted, in conductive contact with, on the one hand, the two branches of the clevis block 5b of the cuff 5 and, on the other hand, with the body 18 forming a sliding support for the conductive push-rod 17 with which the body 18 is also in conductive contact.

The structure of the permanent elastic contact mechanism 16 and the way in which it is mounted are such that the push-rod 17 is permanently pushed back by the elastic means 19 so that its rod end 17a projects radially outwards relative to the body 18.

When the blade 3 is in the folded-back position relative to the cuff 5, it is understood that the end 17a of the push-rod 17 is not in contact with the terminal 15a of the blade root 3a. By contrast, when the blade is brought back into the flight configuration and fixed by its root 3a in the clevis block 5b by the two pins 6, the terminal 15a comes into contact with the end 17a of the conductive push-rod 17 and pushes the latter back into the conductive body 18 against the elastic means 19, which provides electrical continuity between the terminal 15a and the cuff 5 via the push-rod 17, the body 18, the shot pot 21, and possibly also the tubular pin 22.

As an alternative, the conductive terminal 15a on the blade root 3a may be a terminal with a more massive structure which is bonded permanently to the blade 3 or alternatively screwed into a receptacle bonded to the blade 3, but still so that it is in electrical continuity with the loom of conductors metallizing this blade.

When the blade 3 is in the flight configuration, the electrical continuity between the blade 3 and the cuff 5 is permanently afforded by the push-rod 17 being kept elastically in contact with the terminal 15a.

The benefit of such an embodiment, apart from its simplicity and low mass, lies in the elimination of the overhead routings which are compulsory with a link using conductive braid between the blade and the cuff, this overhead routing being all the more important when the blade has to be capable of being folded back, and this embodiment also avoids the screw-washer-locked nut links which are compulsory at the two ends of a linking braid. The mechanism 16 has a low cost and is easy to dismantle in the event of damage by lightning. The lightning test (current striking) is furthermore possible, because of the permanent contact between the terminal 15a and the push-rod 17, which is not the case for a spark arrester of conventional structure.

FIG. 6 represents an alternative form which can be distinguished from the embodiment of FIG. 1b essentially by the means by which the body of the permanent elastic contact mechanism is secured to the cuff 5, which means that the elements which are identical or the elements which are similar to those of FIG. 1b are identified on FIG. 6 respectively by identical references or by the same references given a prime symbol.

In FIG. 6, the permanent elastic contact mechanism 16' has its tubular body 18' integral with the aluminium external bottom 21'a of the shot pot 21', and projecting substantially radially outwards from the central part of this bottom 21' a. The conductive plug 20' is crimped into the corresponding end of the internal housing 18' a of the body 18' also housing the elastic return means 19 consisting of the conductive stack of spring washers, and the head 17b, of the conductive and sliding push-rod 17, of which the end 17a projecting outside the body 18' is pushed back into contact with the terminal 15a of the blade root 3a using a mechanism which operates like the one in FIG. 1b, being built, by its body, into the shot pot 21' mounted in the clevis block 5b of the cuff 5 also as in FIG.1b.

Another difference is that the internal part 21' b of the shot pot 21' has, projecting substantially radially inwards, a lug 51 to which there is fixed by a bolt 52 an end terminal clamp 53a of a metallization conductor 53 with conductive metallic braid produced according to FR-A-2,679,074, the other end terminal clamp of which can be fixed to the conductive support 23, or conductive peg 27 or lug 28 or terminal 29 or spindle 7 (described hereinbelow with reference to FIG. 1a) or, possibly, directly to the conductive part 2b of the hub 2 or any electrically conductive element fixed to this part of the hub 2b in order to provide the electrical continuity between the blade 3 and the hub 2, in parallel with the cuff 5 or in place of the latter when it is made, for example, of a composite material which is not electrically conductive.

The installation for the removal of the electrostatic charge and the passage of lightning current comprises not only the means for affording electrical continuity between the blade 3 and the cuff 5 which have just been described with reference to FIG. 1b or to FIG. 6, and which comprise the permanent elastic contact mechanism 16 or 16', but also means for affording electrical continuity between the cuff 5 and the hub 2, these means now being described with reference to FIG. 1a.

In this example, the metallization, that is to say the removal of electrostatic charge, and the passage of lightning current are provided by different paths between, on the one hand, an electrically conductive support 23 fixed by metallic and electrically conductive threaded spindles 24 against the internal face of the upper part of the cuff 5, at the end of its tubular part 5a near the internal clevis block 5c and, on the other hand, the hub 2 and more precisely the external radial edge 2b of this hub 2 corresponding to the cavity 2a which houses the laminated spherical stop 4 articulating this cuff 5 to the hub 2. This support 23 has, on the same side as the internal clevis block 5c, an electrically conductive peg 25 for fastening one end of an electrically conductive compression coil spring 26, the other end of which is fastened and held around an electrically conductive peg 27 at the end of a lug 28 of an electrically conductive terminal 29 fixed against the metallic and electrically conductive external armature 4b of the laminated spherical stop 4 by one of the electrically conductive threaded spindles 7 fixing this armature 4b to the external radial edge 2b of the hub 2. In this way the conductive support 23, in conductive contact with the conductive cuff 5, is in electrical continuity with the edge 2b of the hub 2 via the peg 25, the spring 26, the peg 27 and the lug 28 of the conductive terminal 29 fixed to the hub 2 by means of the armature 4b. The passage of electrostatic charge, or metallization, between the cuff 5 and the hub 2 is thus provided continuously by the spring 26, connected on one side to the conductive terminal 29 fixed to the hub 2 with the laminated spherical stop 4 and on the other side to the support 23 fixed to the cuff 5. The spring 26 is preloaded in tension so as to compensate for alterations in relative distance between its fastening points to the pegs 25 and 27 during operation as a result of the angular deflections of the cuff 5 and of the blade 3 in terms of pitch, flapping and drag about the center of articulation Cb of the stop 4, this center of articulation Cb lying in the external radial edge 2b of the hub 2.

By way of example, starting from an initial length of 94 mm for the spring 26 preloaded in tension, this spring 26 undergoes a compressive deformation of 12 mm with a flapping of the flapping mass (cuff 5 and blade 3) of 10° upwards, a tensile deformation of 9 mm with a flapping of 8° downwards, a tensile deformation of 5 mm for a pitch of 27°, and a tensile deformation of 0.1 mm for a drag of 6° (forwards or backwards relative to the direction of rotation of the rotor). It is observed that these values for deformation, whether combined or otherwise, are perfectly acceptable for the spring 26.

The passage of lightning current is permitted by a spark arrester in the form of a needle 31 which is screwed via its threaded rear part 31a into a tapped bore of the support 23, and fixed in position by a lock nut 32, also screwed around the threaded part 31a of the needle 31 and tightened down against the body 23, so that the point 31b of the needle 31 is directed radially towards the center of articulation Cb of the laminated spherical stop 4, without contact with a track in the form of a spherical cap 30 of the conductive terminal 29, this track 30 being centered on the center of articulation Cb and thus having its convexity pointing radially outwards, that is to say towards the needle 31. The latter is mounted on the support 23 close to the peg 25 used to attach the spring 26 which serves to attract electricity. Whatever the position of the cuff 5 in terms of pitch, flapping and drag about the center of articulation Cb, the needle 31 directs its point 31b towards this center of articulation Cb and there is never contact between the track in the form of a spherical cap 30 of the stop 29 and the point 31b of the needle 31 during the relative movement of swivelling of the cuff 5 about the laminated spherical stop 4 because, when the rotor stops, there is a minimum clearance (for example of 0.3 to 0.6 mm)

between the needle 31 and the track 30, and this minimum clearance is increased, when the rotor rotates, because of the crushing, under load (centrifugal force and flight load factor), of the laminated spherical stop 4 both in the plane of the rotor and along the axis A—A thereof.

The spring 26, held elastically in permanent contact with the terminal 29, and which may be replaced by two springs mounted in parallel, if necessary, together with the needle 31 and the support 23 is visible and accessible from the side between the two branches of the internal clevis block 5c, making maintenance easier. As an option, just one drag stop (not represented in FIG. 1a) bolted laterally to the cuff 5 may have to be dismantled from this cuff 5 for better accessibility for maintenance. In order for the installation to be light and economical, the terminal 29, the support 23, the needle 31 and its lock nut 32 are made of a material with good electrical conductance and low density, such as aluminium. Furthermore, a locking filament 33 is embedded in the needle 31, in the lock nut 32 and in the support 23 in order to prevent the slackening of the lock nut 32 securing the needle 31 to the support 23.

The alternative form of FIG. 2 differs from the example described hereinabove with reference to FIGS. 1a and 1b only in the way in which the means for affording electrical continuity between the cuff 5 and the hub 2 are produced, which means that the text hereinbelow is restricted to a description of the means specific to this alternative form of FIG. 2 for affording the electrical continuity at this point, the means which are similar to those of the preceding example being identified by the same numerical references with a prime symbol.

In this alternative form, again there is an electrically conductive terminal 29' including a track 30' in the form of a spherical cap centered on the center of articulation Cb of the laminated spherical stop 4, and with its convexity pointing radially outwards, and the terminal 29' is fixed to the electrically conductive and metallic part of the hub 2 forming the external radial edge 2b of the corresponding cavity 2a by a metallic and electrically conductive threaded spindle 7 which brings the terminal 29' into conductive contact against the metallic and electrically conductive external armature 4b of the stop 4, this armature 4b being itself in electrically conductive contact with the external radial edge 2b of the hub 2 as in the preceding example. However, in this alternative form, the terminal 29' and its track in the form of a spherical cap 30' are made of cemented steel. Here again, radially towards the outside of the spherical track 30' there is a metallic and electrically conductive support 23' fixed in conductive contact against the internal face of the upper wall of the cuff 5, in the end of its tubular part 5a which is near the internal clevis block 5c, by metallic and electrically conductive threaded spindles 24'.

However, unlike the first example, in this alternative form a metallic and electrically conductive swivelling arm 35 is mounted so that it can pivot by one end 35a about a pivot pin 36 borne by the support 23' and orientated substantially perpendicular to the longitudinal axis of the cuff 5 and the axis of rotation A—A of the rotor, while a cemented steel ball 37, which is therefore electrically conductive, is crimped into the other end 35b of the arm 35, which is slightly cranked between its ends. The arm 35 and the support 23' are made, for example, of a lightweight conductive alloy such as an aluminium alloy, and the electrical continuity between the cuff 5 and the conductive ball 37 is afforded through the support 23', its pivot pin 36 and the arm 35. The ball 37 is in permanent elastic and electrically conductive contact with the spherical track 30' of the terminal 29' mounted on the hub 2 and in electrical continuity with it, for removing electrostatic charge and also passing lightning current along a common path, by virtue of elastic return means 39 consisting of a stack of metallic spring washers or, as an alternative, of a metallic coil spring, these elastic return means 39 being mounted between a lug 38 integral with the support 23' and which extends the latter towards the inside of the cuff 5 and towards its longitudinal axis, on the one hand, and, on the other hand, the swivelling arm 35 in its cranked part close to the ball 37. The permanent elastic and conductive contact of this ball 37 against the spherical track 30', bearing in mind the force (opposing) of inertia of the ball 37, is obtained by compressing the spring washers or the coil spring constituting the elastic return means 39. The latter are mounted around a spindle 40 which is a screw passing through the arm 35 and held by its head against that face of the arm 35 which points towards the spherical track 30', the spindle 40 being fixed to the arm 35 by a blocking nut 41 screwed onto the threaded shank of the screw which runs towards the lug 38 of the support 23' and passes through a slot 38a formed in this lug 38, the blocking nut 41 being tightened down against that face of the arm 35 which points towards the lug 38. The stack of spring washers or the coil spring constituting the elastic means 39 rests, on the same side as the arm 35, against a washer 42 surrounding the shank of the spindle 40 and against the blocking nut 41 and, on the same side as the lug 38, against a similar washer 43 around the shank of the spindle 40 and resting against that face of the lug 38 which points towards the arm 35. A doubly-locked nut 44 is screwed and immobilized on the free end of the shank of the spindle 40, beyond the lug 38 and towards the inside of the cuff 5 so that this nut 44 can act as a stop, by contact against the lug 38, to limit the pivoting of the arm 35 in a direction which takes it away from the lug 38 under the action of the spring means 39 when this mechanism is dismantled from the cuff 5 or with the latter. The spindle 40 is held on the lug 38 of the support 23' with a substantial axial clearance between this lug 38 and the stop 44 limiting the amplitude of swivelling of the arm 35. This substantial axial clearance is provided in order to allow the axial movements of the spindle 40 relative to the lug 38 when the ball 37 and the arm 35 are driven by the support 23' and the cuff 5 in the deflections in terms of pitch, flapping and drag of this cuff relative to the hub 2 to which the terminal 29', with its spherical track 30', is fixed.

The example of FIGS. 3 to 5 is very similar to that of FIG. 2, of which it is merely an alternative form of assembly, which means that the same numerical references, with a prime or double prime symbol, are used to denote the similar elements.

In this alternative form, in which the metallization and the passage of lightning current take place by the same path, as in the example of FIG. 2, again there is a cemented-steel ball 37' crimped into one end of an electrically conductive swivelling cranked arm 35' mounted so that it can pivot by its other end on a pivot pin 36', also electrically conductive and with which the arm 35' is in conductive contact, of a support which is itself conductive and which, in this example, is a drag stop 45 mounted so that it can be removed from the side in conductive contact with the cuff 5 by two bolts 46 (see FIG. 3) on a lateral flange 5d of the end of the tubular part 5a of the cuff 5 which is adjacent to the internal clevis block 5c. In this position, the drag stop 45 is fixed to the cuff 5 directly opposite a drag stop 47 (see FIG. 3) projecting outwards from the corresponding external radial edge 2b of the hub plate 2 in order to limit the drag movements of the blade 3 and of the cuff 5 on one side (towards the back or towards the front relative to the center of rotation of the rotor).

Here too there is a track in the form of a spherical cap 30", which is electrically conductive and in conductive contact with a conductive terminal 29" to which the track 30" is welded, or on which it is held by a circlip, or any other fixing and blocking means. In this alternative form, the terminal 29" is shaped as an angle bracket to make it easier to fix it, using two electrically conductive threaded spindles, to the external armature of the laminated spherical stop linking the cuff 5 to the hub 2, these threaded spindles (not represented) passing through two holes 48 formed in the part of the angle bracket 29" which is substantially perpendicular to its part which has the spherical track 30".

This embodiment differs from the previous one (FIG. 2) in that the pivoting of the swivelling arm 35' takes place "horizontally", that is to say practically within the plane of rotation of the rotor, which is a plane substantially perpendicular to the axis of rotation of the rotor, rather than "vertically", that is to say in a radial plane passing through the axis of rotation of the rotor as in FIG. 2. The arrangement of FIGS. 3 to 5 avoids the need to pierce the cuff 5 in its upper wall for the passage of the threaded spindles 24' fixing the support 23' of FIG. 2 to the cuff 5. In the alternative form of FIGS. 3 to 5, the arm 35' is mounted so it can swivel on a non-vital component which already exists for other functions, that is to say the drag stop 45 which is fixed in a removable manner to the cuff 5. The swivelling arm 35', equipped with its cemented ball 37', is pressed, by a stack of several spring leaves 39', working in bending, onto the spherical track 30" integral with the conductive terminal 29" shaped as an angle bracket which is fixed to the conductive part 2a of the hub 2. These spring leaves 39' are fixed to the swivelling arm 35' by one of their end parts, using rivets 49 (or bolts or other fixing means), while the spring leaves 39' rest via their other end against the drag stop 45. The dismantable nature of the assembly consisting of the swivelling arm 35' with its ball 37' and of the drag stop 45 is easily achieved using the bolts 46 on the corresponding side of the cuff 5.

In cases where the cuff 5 is not metallic, but consists for example of two sheets of composite material held apart by spacer pieces to form the internal clevis block 5c and external clevis block 5b, or also in the absence of a metallization system of the type proposed for example between the cuff and the hub, the electrical continuity between the hub edge 2a or the external armature 4b or the terminal 29 or 29' or the support 23 of FIG. 1a or 23' of FIG. 2 or the drag stop 45 of FIGS. 3 to 5, on the one hand, and, on the other hand, the shot pot 21 or 21' of FIG. 1b or 6 may be afforded by a conductive cable, preferably of the type described in FR-A-2,679,074. As an alternative, this metallization cable may be fastened directly, by one end, to a fastening lug 50 projecting from the angle bracket-shaped terminal 29" as represented in FIG. 4. In this case, this conductive cable affords the electrical continuity directly from the shot pot 21 to the conductive terminal 29", and therefore to the hub 2. The arrangement of such a conductive cable inside the cuff 5 or between two sheets of composite held apart by spacer pieces to constitute an equivalent connecting member to the cuff 5, with this conductive cable linked on the one hand to the hub 2 close to the center of articulation of the laminated spherical stop 4 and, on the other hand, to the shot pot 21, at a point quite away along the span in the cuff 5, has the advantages of substantial limitation of the movements of this conductive cable relative to an external mounting, and of increased safety in the event of untimely breakage of this conductive cable, the latter not being ejected and remaining within the cuff 5. The same advantages are obtained, in the absence of a terminal 29", of a pivoting arm 35' and of a drag stop 45, when the conductive cable, like the cable 53 of FIG. 6, connects the shot pot 21' to an angle bracket similar to the one of the terminal 29" fixed to the edge of the hub 2a directly or via the external armature 4b.

As described in the aforementioned French Patent, this conductive cable may include a conductive braid reinforced at its middle by a metallic cable held at its two ends by end fittings in the form of olives crimped into their respective terminal clamp.

FIG. 7 represents an alternative form of FIG. 1b for a rotor in which, in the known manner, each blade may be folded back automatically by pivoting relative to its cuff for linking to the hub, by virtue of an actuator arranged in the cuff and causing a hinging fitting to which the blade is fixed by its root to pivot on this cuff, which means that similar elements are identified by the same numerical references with the prime symbol.

Each blade 3' has its root 3'a fixed by two parallel pins side by side on each side of the longitudinal axis X—X of the cuff 5' and of the blade 3' and identified solely by their axis 6' in FIG. 7, into a clevis block 55 of a hinging fitting 54 which is mounted so that it can pivot on the external radial part of the cuff 5' about a geometric axis of folding B—B offset laterally with respect to the longitudinal axis X—X of the cuff 5', and substantially parallel to the rotor rotation axis A—A (see FIG. 1a). This pivoting of the fitting 54 on the cuff 5' is afforded by virtue of a cylindrical and lateral bearing 56 offset on one side of the fitting 54 and which rotates about a pin 57 of the hinging articulation. The bearing 56 of the fitting 54 is mounted and held in an external and lateral radial clevis block with an upper branch 5'f and lower branch 5'g of the cuff 5' by the pin 57 about which the bearing 56 rotates by virtue of stepped rings 58 and 59 mounted about the pin 57 and engaged in the bearing 56, and each resting via their step against respectively an upper face and a lower face of the bearing 56, a nut 60 being screwed and held on the threaded lower end of the pin 57 which protects under the lower clevis block branch 5'g. The pin 57 is coaxial with the axis of pivoting B—B to obtain the pivoting of the fitting 54 by maneuvering an actuator represented diagrammatically as 61 in FIG. 7, and fixed by its body into the cuff 5' by any appropriate means. On the other side of the axis X—X relative to the bearing 56, the fitting 54 has a stop (not represented in FIG. 7) turned towards the cuff 5' and which becomes housed in a housing (also not represented) open radially towards the outside of this cuff 5', when the fitting 54 is in the position not folded back by the actuator 61, which position corresponds to the flight configuration (FIG. 7).

In this embodiment, the electrical continuity between the blade 3' and the fitting 54 is afforded by another permanent elastic contact mechanism 62 represented in detail on a larger scale in FIG. 8.

This mechanism 62 is embedded in the central part of the bottom of the clevis block 55 of the fitting 54 so as to face the internal radial end of the blade root 3'a, and more precisely the conductive terminal 15'a consisting of the part emerging, at this point, of a metallization conductor 15' consisting of a copper tape elsewhere embedded in the blade 3'.

The mechanism 62 comprises a cylindrical contact peg 63 with a widened head having a contact bearing surface in the form of a spherical cap 64 pointing towards the blade root 3'a, the peg 63 sliding axially with contact via its body in a stepped ring 65, which is mounted in a bore formed in the bottom of the clevis block 55 of the fitting 54, and resting by its step 66 against this bottom of the clevis block 55. A stack of a few spring washers 67, which is mounted between the step 66 and the head 64 of the peg 63, pushes the peg 63 back towards the blade root 3'a in order to afford permanent elastic contact of the head 64 against the conductive terminal 15'a of the blade 3' when this blade 3' is mounted in the fitting 54. When the blade 3' is dismantled from the fitting 54, the movement of the peg 63 under the action of the spring washers 67 (or of any other equivalent elastic return means) is limited by a circlip 68 mounted around the end part of the peg 63 on the opposite side to its head 64, this method of mounting allowing the peg 63 to move back against the action of the spring washers 67, under the thrust of the blade 3' upon mounting in the fitting 54.

Since the peg 63 and its head 64, the stepped ring 65 and the spring washers 67 are electrically conductive, as is the fitting 54, it is understood that the electrical continuity is afforded by these members between the conductive terminal 15'a of the blade root 3'a and the fitting 54. It is noted that the peg 63 may be fitted with a small angle between its longitudinal axis and the common longitudinal axis X—X of the cuff 5' and of the blade 3' with the fitting 54 in the flight configuration.

Finally, the electrical continuity between the fitting 54 and the cuff 5' is afforded by contact of the electrically conductive materials of the fitting 54, and therefore of its bearing 56, of the stepped rings 58 and 59, and of the hinge pin 57, in conductive contact with the branches 5'f and 5'g of the clevis block of the cuff 5' receiving the fitting 54.

As an alternative, as before, if the cuff 5' is not electrically conductive, for example is made of a composite material, a conductive cable with a metallization braid may be connected, by one end, to the hinge pin 57, or directly to the contact peg 63 if the hinging fitting 54 is also not electrically conductive, it being possible for the other end of the metallization cable to be connected to the conductive support 23 or 23' of FIG. 1a or of FIG. 2, or alternatively directly to the edge of the hub 2b, to the external armature 4b or to any other electrically conductive member fixed to this hub part 2a, for example a conductive terminal such as 29 or 29', without this, in this case, needing to have a spherical contact track. In this alternative form, the advantages associated with the presence of a conductive cable running inside the cuff 5', as explained hereinabove, are again observed.

We claim:

1. An installation for providing electrical continuity on a rotorcraft for an electrostatic charge and a lightning current, said installation comprising:
    a rotor mast defining an axis of rotation and having a hub integral in terms of rotation therewith, a metallic part of said mast and hub being in electrical continuity with a structure of the rotorcraft;
    a plurality of blades, each said blade having at least one electric conductor there-along;
    a respective plurality of linking members which extend substantially radially from said hub and which are respectively connected to a respective said blade;
    a respective plurality of articulating means for respectively connecting and articulating a respective said linking member to said hub; and
    a continuity means for providing electrical continuity between said metallic part and said electric conductors of said blades, said continuity means including for each respective said blade:
        an electrically conductive member (a) integral with a respective said linking member during any deflections by a respective said articulating means in terms of pitch, flapping and drag of the respective said blade relative to said hub and (b) electrically connected to said electric conductor of the respective said blade,
        an electrically conductive terminal integral with said hub and in electrical continuity with said metallic part, and
        an elastic means for permanently maintaining a respective said conductive member in electrical contact with a respective said conductive terminal during any deflections of the respective said blade.

2. An installation as claimed in claim 1:
    further including:
        a respective plurality of supports, each said support being fixed to a respective said linking member, and
        a respective plurality of swivelling arms mounted for swiveling to a respective said support and to which a respective said conductive member is mounted; and
    wherein a respective said elastic means urges a respective said swivelling arm so that the respective said conductive member is moved into elastic contact against the respective said conductive terminal.

3. An installation as claimed in claim 2:
    wherein each said support and respective said swivelling arm are electrically conductive;
    wherein each said support is in electrical continuity with a respective said conductor;
    wherein each said conductive member is mounted in conductive contact with the respective said swivelling arm; and
    wherein each said elastic means elastically biases the respective said swivelling arm relative to the respective said support.

4. An installation as claimed in claim 3:
    further including for each said conductive member
        a spindle fixed to a respective said swivelling arm and extending axially to a respective said support for axial movement relative to the respective said support, and
        a stop limiting means for limiting the axial movement of a respective said spindle relative to the respective said support; and
    wherein each said elastic means is mounted between the respective said swivelling arm and support and about the respective said spindle.

5. An installation as claimed in claim 3:
    wherein each said elastic means is at least one spring leaf having a first end attached to a respective said swivelling arm and a second end resting against a respective said support, each said at least one spring leaf being bent when a respective said blade is in an operating position so as to urge the respective said conductive member in contact with the respective said conductive terminal; and
    further including for each said blade at least one drag stop attached to a respective said support.

6. An installation as claimed in claim 3:
    wherein each said conductive member is a ball made of cemented steel which is crimped into a first end of a respective said swivelling arm;

wherein a respective spindle attaches a second end of each said swivelling arm to a respective said support, said spindle being mounted substantially perpendicular to a radial direction of the respective said linking member relative to the axis of rotation;

wherein each said conductive terminal includes a spherical cap projecting radially outwards from said hub, each respective said cap being centered on a center of articulation of a respective said articulating means such that an elastic thrust of a respective said ball during any deflections is received by the respective said cap about a respective center of articulation.

7. An installation as claimed in claim 1:

further including a respective plurality of electrically conductive supports mounted to a respective said linking member and in electrical continuity with a respective said conductor of the respective said blade;

wherein each said conductive member and respective said elastic means together comprise a respective deformable member of elastically variable length attached to a respective said support;

wherein each said conductive terminal includes a spherical cap projecting radially outwards from said hub, each said cap being centered on a respective center of articulation of a respective said articulating means; and still further including a respective plurality of spark arresters for passing lightning current for each respective said blade, each said spark arrester including an electrically conductive needle fixed to a respective said support adjacent to a respective said deformable member so that a point of said needle points towards the center of articulation of a respective said articulating means but is spaced from a respective said spherical cap.

8. An installation as claimed in claim 1 and further including a respective plurality of electrically conductive fixing means (a) for fixing a respective said articulating means to said metallic part of said mast and hub and (b) for fixing a respective said conductive terminal to said hub.

9. An installation as claimed in claim 8:

wherein each said linking member includes an internal clevis block having opposed branches;

wherein a respective portion of said metallic part of said mast and hub is engaged by each respective said internal clevis, and a center of articulation of a respective said articulating means lies in a respective said portion;

wherein each said fixing means includes a laminated spherical stop having
an internal radial armature fixed between said opposed branches of a respective said linking member,
an external radial armature, and
an electrically conductive threaded spindle which attaches said external radial armature to said portion of a respective said metallic part;

wherein each said conductive terminal includes a spherical cap which is fixed to said hub by a respective said threaded spindle so that each said spherical cap is provided inside of a respective said internal clevis block with a convexity thereof pointing substantially radially outwards; and wherein each said conductive member includes a support fixed to a respective said linking member whereby each said conductive member is mounted inside of a respective said internal clevis block.

10. An installation as claimed in claim 1 wherein said continuity means further includes for each respective said blade:

a second conductive member which is movable and which is integral with one of (a) a root of a respective said blade and hence in electrical continuity with a respective said electric conductor or (b) a respective said linking member and hence in electrical continuity with a respective said first-mentioned conductive member;

a second conductive terminal integral with the other of (a) the root of a respective said blade and hence in electrical continuity with the respective said electric conductor or (b) the respective linking member and hence in electrical continuity with the respective said first-mentioned conductive member; and a second elastic return means for holding a respective said second conductive member in contact with a respective said second conductive terminal when said blade is in a flight configuration.

11. An installation as claimed in claim 10:

wherein said continuity means further includes for each respective said blade a respective tubular body which is electrically conductive and which has a plug closing one end thereof;

wherein each respective said second conductive member is a respective push-rod mounted for sliding movement in a respective said tubular body so that said push-rod remains in permanent contact therewith, each said push-rod having a projecting end which projects from the respective said tubular body into contact with a respective said second conductive terminal and an opposite stop end which prevents said push-rod from exiting from the respective said tubular body; and wherein each said second elastic return means is positioned between a respective said plug and stop end in order to urge a respective said projecting end into contact with the respective said second conductive terminal.

12. An installation as claimed in claim 10 wherein each said second conductive terminal is a component attached to said other of the respective said root or linking member.

13. An installation as claimed in claim 10 wherein each said second conductive terminal is a part of a respective said electric conductor located at a respective surface of said other of the respective said root or linking member.

14. An installation as claimed in claim 10:

wherein each respective said linking member includes an external clevis block and two substantially mutually parallel pins which said pins hold said root of a respective said blade in a respective said external clevis block, one of said pins being removable so that the respective said blade can be folded back relative to the respective said linking member by pivoting about the other said pin from the flight position to a storage position;

wherein each respective said second conductive terminal is located on an internal radial end of a respective said blade root; and wherein each respective said second conductive member is located opposite to the respective said second conductive terminal on the respective said linking member and projects into a respective said external clevis block such that when the respective said blade is in the storage position the respective said second conductive member is out of contact with the respective said second conductive terminal.

15. An installation as claimed in claim 14:

further including, for each respective said linking member and blade, a balancing shot pot having an external radial shot part, each said shot pot being electrically conductive and located at a bottom of the respective said external radial clevis block; and wherein each respective said second conductive member is integral with a respective said radial shot part such that said second conductive member projects substantially radially outwards from the respective said shot part and into contact with the respective said second conductive terminal when the respective said blade is in the flight configuration.

16. An installation as claimed in claim 15:

wherein each respective said external radial clevis block includes two opposed branches; and further including a respective tubular pin which holds a respective said shot pot between a respective said two opposed branches, said tubular pin being hollow for filling and emptying of the respective said shot pot.

17. An installation as claimed in claim 10:

further including a respective plurality of hinging fittings, each said hinging fitting having an external clevis block in which a respective said root of a respective said blade is held, and a respective plurality of conductive links, each said conductive link connecting a respective said hinging fitting to a respective said linking member such that the respective said blade is pivotable about an axis of the respective said link for folding back the respective said blade relative to the respective said linking member;

wherein each said second conductive terminal is provided on an internal radial end of the respective said root; and wherein each said second conductive member is located in a respective said external clevis block and projects substantially radially outwards from the respective said hinging fitting and into permanent contact with the respective said second conductive terminal.

18. An installation as claimed in claim 17:

wherein each respective said second conductive member includes a contact peg having a head with a spherical bearing surface which contacts the respective said second conductive terminal, and a stepped ring which is mounted in a bottom of a respective said external clevis block and in which a respective said peg slides with limited travel; and wherein a respective said elastic means is located between a respective said stepped ring and a respective said head in order to urge the respective said head away from the respective said stepped ring and into contact with the respective said second conductive terminal.

19. An installation as claimed in claim 10 wherein each respective said linking member includes an electrically conductive portion which provides electrical between a respective said first-mentioned conductive member and a respective one of said second conductive member or second conductive terminal which is integral with the respective said linking member.

20. An installation as claimed in claim 10 wherein said continuity means further includes for each respective said blade an electrically conductive cable running along a respective said linking member from a respective said second conductive terminal to said metallic part.

* * * * *